US012480287B2

(12) United States Patent
Mathew et al.

(10) Patent No.: US 12,480,287 B2
(45) Date of Patent: Nov. 25, 2025

(54) SYSTEMS AND METHODS FOR IDENTIFYING AND LOCATING MISSING OR DAMAGED GROUND-ENGAGING TOOLS

(71) Applicant: Caterpillar Inc., Peoria, IL (US)

(72) Inventors: Shawn N. Mathew, Savoy, IL (US); Arthur Milkowski, Oro Valley, AZ (US); Subhani M. Shaik, Peoria, IL (US); Norman Lay, Baden, PA (US)

(73) Assignee: Caterpillar Inc., Peoria, IL (US)

( * ) Notice: Subject to any disclaimer, the term of this patent is extended or adjusted under 35 U.S.C. 154(b) by 427 days.

(21) Appl. No.: 18/060,809

(22) Filed: Dec. 1, 2022

(65) Prior Publication Data

US 2024/0183132 A1 Jun. 6, 2024

(51) Int. Cl.
*E02F 9/26* (2006.01)
*E02F 9/20* (2006.01)
*G06T 7/00* (2017.01)

(52) U.S. Cl.
CPC ........... *E02F 9/268* (2013.01); *E02F 9/205* (2013.01); *E02F 9/2054* (2013.01); *E02F 9/261* (2013.01); *E02F 9/264* (2013.01); *G06T 7/0008* (2013.01); *G06T 2207/20081* (2013.01); *G06T 2207/30164* (2013.01); *G06T 2207/30252* (2013.01)

(58) Field of Classification Search
CPC ........ E02F 9/268; E02F 9/205; E02F 9/2054; E02F 9/261; E02F 9/264; G06T 7/0008; G06T 2207/20081; G06T 2207/30164; G06T 2207/30252; G06V 20/52
See application file for complete search history.

(56) References Cited

U.S. PATENT DOCUMENTS

| | | |
|---|---|---|
| 8,411,930 B2 | 4/2013 | Ridley et al. |
| 9,886,754 B2 | 2/2018 | Lim et al. |
| 10,316,497 B2 | 6/2019 | Miller |
| 10,580,276 B2 | 3/2020 | Mondal et al. |
| 10,697,154 B2 | 6/2020 | Bewley et al. |

(Continued)

FOREIGN PATENT DOCUMENTS

| | | |
|---|---|---|
| WO | 2012116408 A1 | 9/2012 |
| WO | 2016131007 A1 | 8/2016 |
| WO | 2021026597 A1 | 2/2021 |

OTHER PUBLICATIONS

Written Opinion and International Search Report for Int'l. Patent Appln. No. PCT/US2023/079558, mailed Mar. 12, 2024 (13 pgs).

*Primary Examiner* — Jason Holloway
*Assistant Examiner* — Madison B Emmett

(57) ABSTRACT

A method for monitoring and confirming damaged or missing ground-engaging tools at a worksite includes receiving an alert associated with a damaged or missing ground-engaging tool of an earthmoving machine, receiving a confirmation for the damaged or missing tool, and generating a containment area representing one or more locations where at least part of the ground-engaging tool is potentially located. The method also includes determining that an additional machine was present in the containment area and taking an action for the additional machine based on the presence of the machine in the containment area, the action including generating a notification or controlling an action of the additional machine.

20 Claims, 5 Drawing Sheets

(56) References Cited

U.S. PATENT DOCUMENTS

| | | |
|---|---|---|
| 10,787,792 B2 | 9/2020 | Carpenter et al. |
| 11,447,931 B2 * | 9/2022 | Plouzek .................... E02F 9/26 |
| 2012/0098654 A1 | 4/2012 | Ebert |
| 2016/0186412 A1 | 6/2016 | Miller |
| 2017/0103506 A1 | 4/2017 | Dandibhotla et al. |
| 2017/0287124 A1 | 10/2017 | Lim et al. |
| 2021/0262204 A1 * | 8/2021 | Tafazoli Bilandi ... G06T 7/0004 |
| 2021/0324611 A1 | 10/2021 | Hall |
| 2024/0059323 A1 * | 2/2024 | Gerrese ................ H04W 4/023 |

* cited by examiner

SYSTEMS AND METHODS FOR IDENTIFYING AND LOCATING MISSING OR DAMAGED GROUND-ENGAGING TOOLS

TECHNICAL FIELD

This disclosure relates generally to monitoring one or more aspects of a worksite, and more particularly, to systems and methods for monitoring ground-engaging tools associated with machines operating at a worksite.

BACKGROUND

Worksites, such as mines, operate most efficiently when multiple machines perform work functions concurrently. In above-ground and underground mining settings, machine functions include digging, scraping, and lifting material, placing the material in a bucket, loading the material in a haul truck, transporting the material with the haul truck, and processing the material. In some types of mines, large pieces of material may be processed by a crusher that breaks the material into finer fragments or particles.

To facilitate the collection of material and reduce maintenance costs, earthmoving machines such as mining shovels, loaders, and others, include implements that have ground-engaging tools (GETs). These GETs are formed of extremely hard and wear-resistant materials. While GET failures involving partial or complete separation from the machine are rare, these failures can incur significant costs and downtime. For example, a separated GET can cause damage to a crusher at the worksite, significantly impacting overall productivity and potentially requiring costly repairs.

While monitoring systems can assist in avoiding this rare-but-severe damage to processing machinery, these monitoring systems introduce other disadvantages. For example, some systems are associated with frequent false alarms, which can cause a work site to repeatedly shut down when it is not necessary to do so. These false alarms can themselves cause reduced productivity. Frequent false alarms are typically ignored by operators, effectively eliminating any benefits of the monitoring devices. Additionally, while monitoring systems can identify a missing or damaged GET on a machine, they may not take into account the entire mine site operation in confirming and locating the missing or damaged GET.

An exemplary system for monitoring a tooth or adaptor of a mining shovel is described in U.S. Patent Application Publication No. 2021/0262204 A1 ("the '204 publication") to Tafazoli Bilandi et al. The monitoring system described in the '204 publication involves image analysis, using a neural network, to determine when a tooth of an implement is missing. The monitoring system can identify a missing tooth by checking whether visually-identified teeth are equally spaced and compare the number of identified teeth to the expected number of teeth on the implement. While the system described in the '204 publication may be helpful for identifying a missing tooth, it does not address the potential for false positives or unnecessary down-time associated with false positives or other detection failures.

The techniques of this disclosure may solve one or more of the problems set forth above and/or other problems in the art. The scope of the current disclosure, however, is defined by the attached claims, and not by the ability to solve any specific problem.

SUMMARY

In one aspect, a method for monitoring and confirming damaged or missing ground-engaging tools at a worksite may include receiving an alert associated with a damaged or missing ground-engaging tool of an earthmoving machine, receiving a confirmation for the damaged or missing tool, and generating a containment area representing one or more locations where at least part of the ground-engaging tool is potentially located. The method may also include determining that an additional machine was present in the containment area and taking an action for the additional machine based on the presence of the machine in the containment area, the action including generating a notification or controlling an action of the additional machine.

In another aspect, a method for reducing false alarms associated with damaged or missing tools may include receiving an alert associated with a potentially damaged or missing tool of an earthmoving machine, requesting confirmation of the potentially damaged or missing tool, and continuing to perform work with the earthmoving machine after receiving the alert. The method may also include: receiving confirmation of the damaged or missing tool and generating a signal for isolating or stopping the earthmoving machine or an associated machine, or receiving confirmation that the potentially damaged or missing tool is not damaged or missing and allowing the earthmoving machine or the associated machine to continue operating.

In yet another aspect, a supervisory controller for monitoring and confirming a missing or damaged tool for an earthmoving machine may include at least one memory storing instructions and at least one processor operatively connected to the memory, and configured to execute the instructions to perform operations. The operations may include receiving an alert associated with a damaged or missing tool of a machine, in response to receiving the alert, receiving machine location information associated with the machine, generating a request for confirming the missing or damaged tool, and generating a containment area, based on the machine location information and receiving a confirmation of the missing or damaged tool.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosure.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a method or apparatus that comprises a list of elements does not include only those elements, but may include other elements not expressly listed or inherent to such a method or apparatus. In this disclosure, relative terms, such as, for example, "about," "substantially," "generally," and "approximately" are used to indicate a possible variation of +10% in the stated value or characteristic.

Figure 1:
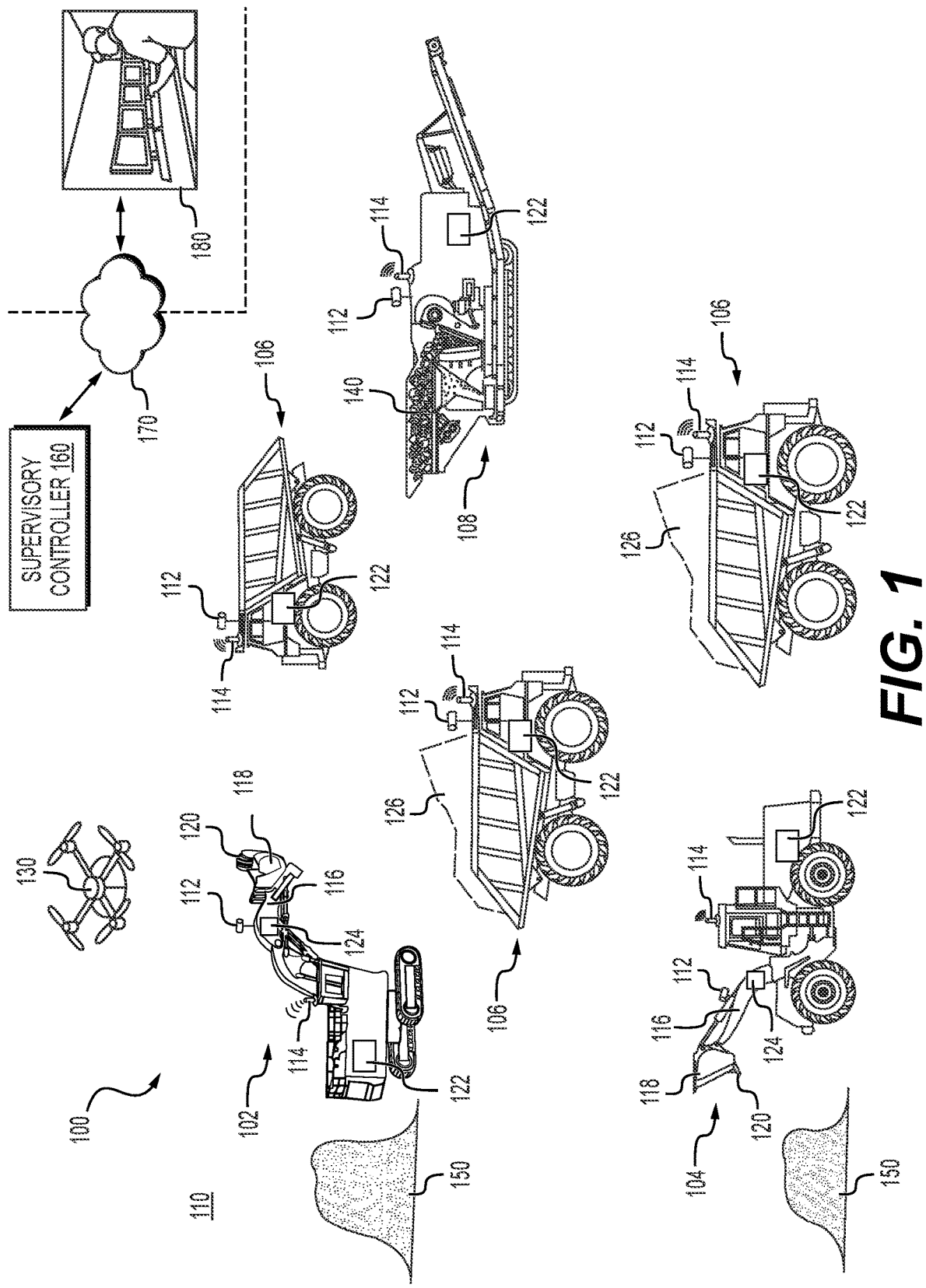
FIG. 1 is a schematic view of an exemplary environment in which a ground-engaging tool monitoring system may be utilized, according to aspects of the disclosure.

FIG. 1 is a schematic illustration showing an environment 110 in which a ground-engaging tool monitoring system 100 may identify and confirm missing or damaged ground-engaging tools. System 100 may be configured to allow continued operation on the worksite and avoidance of false alarms, while taking steps to contain machines that may have operated in a region (e.g., a "containment area" as described below) in which a ground-engaging tool may have become damaged or lost.

System 100 may include a plurality of machines, a vision system including vision devices 112 distributed on a plurality of machines and/or at other locations of environment 110. System 100 may also include a supervisory controller 160 and a communication system enabling communication between the machines and supervisory controller 160. If desired, the communication system may also enable supervision of these machines with a remote supervisory system 180 that communicates with the machines and/or with supervisory controller 160.

The machines of system 100 may include one or more earthmoving machines 102 and 104, such as a mining shovel (earthmoving machine 102), a loader (earthmoving machine 104), or other types of work-performing machines. System 100 may include one or more transportation or hauling machines 106, such as haul trucks. When environment 110 is located at or includes a mining worksite, machines of system 100 may include one or more processing machines 108, such as a conveyor and/or crushing machine configured to crush raw materials delivered via machines 102, 104, and 106. While machines 102, 104, 106, and 108 are illustrated and described herein as being used in a mining (e.g., surface mining) environment 110, as understood, these machines and other components of system 100 may include other types of machines and/or may perform tasks at a different type of worksite (e.g., paving, construction, forestry, etc.). If desired, one or more drones 130 or other systems may assist with ground-engaging tool monitoring.

Earthmoving machines 102 and 104 may include a ground-engaging implement 118, including a bucket, ripper, blade, scraper, etc., that is movable with one or more implement linkages 116. Linkage 116 may include, for example, a hydraulically-movable boom and/or stick. A ground-engaging tool (GET) 120 connected to implement 118. Each implement 118 may be equipped with a plurality of GETs 120 or a single GET 120. GET 120 may include teeth and/or adapters, as well as other components attachable to an implement 118 such as protectors for the sides or edges of implement 118, including lip shrouds, side shrouds, and others. As used herein, the phrase "missing GET" is understood to be interchangeable with "missing or damaged GET," and includes ground-engaging tools that have become damaged but not significantly separated from an implement, tools that have been completely separated from an implement (and which may or may not be damaged), and tools that have become partially separated from an implement. Machines 102 and 104 may also include one or more machine-vision devices 112, communication or network devices 114, a machine controller 122, and an inertial measurement unit (IMU) 124, as described below.

Haul machines 106 may each have a bed configured for receiving and hauling material 126 supplied with machines 102 and 104. Haul machines 106 may be configured for manual (on-site or remote) control, fully-autonomous control, or partially-autonomous control. Haul machines 106 may include one or more vision devices 112 and one or more network devices 114 to enable haul machines 106 to identify or confirm a missing or damaged GET, locate the GET, and determine when machine 106 has entered a containment area, described below. Each haul machine 106 may include a machine controller 122 configured to communicate with other machine controllers 122 and to supervisory controller 160. Haul machine 106, when used in a mining environment 110, may have a capacity suitable for receiving separated material 126 (e.g., rock, ore, or other raw materials) from material source 150.

Processing machine 108 may be configured to receive material 126 from machines 106. This received material 140 may be processed, as one example, by crushing the material with machine 108. Thus, processing machine 108 may be a crusher that includes material-crushing components that impart large forces on material 140. In some aspects, this material-crushing machinery may be susceptible to damage when a GET is present within material 140.

Processing machine 108 may include a vision device 112, a network device 114, and a machine controller 122. Like machines 102, 104, and 106, machine 108 may be manually controlled, fully-autonomously controlled, or partially-autonomously controlled. For example, when machine 108 is located within a containment area (described below), machine 108 may autonomously or automatically stop operation. In contrast, one or more other machines 102, 104, 106 of environment 110 may be able to continue performing at least some functions when located within a containment area.

The machines of system 100, including machines 102, 104, 106, and 108, may be configured to cooperatively identify, confirm, and locate a missing GET 120 and establish containment areas in which work processes may be altered until a missing GET 120 is located. A vision system may include vision devices 112 present on a plurality of these machines. If desired, vision devices 112 may also be present at locations off-board of machines 102, 104, 106, and 108, such as stationary locations within environment 110 and/or on a mobile land-based or aerial drone 130.

Supervisory controller 160 may include one or more systems located within environment 110. In particular, supervisory controller 160 may be located at a worksite, such as a mine. Supervisory controller 160 may be configured to communicate with one or more of machines 102, 104, 106, and 108 via network 170 or another communication method. Supervisory controller 160 may enable one or more users (e.g., supervisors) to monitor progress at the worksite, monitor current and past geographic locations and actions (e.g., lifting, dumping, hauling, etc.) of one or more machines, monitor past, current, and future tasks of the machines, monitor the status of the machines, and monitor other types of information in a real-time or near real-time manner. When a missing GET is detected, supervisory controller 160 may enable visual display of the implement 118 with the missing GET, visual display of a request for confirmation that the GET is missing, and/or display of a containment area which may include a probability map (or heat map) or other form of notification illustrating potential locations of the missing GET, as well as the identity and/or locations of machines that should be isolated after completing one or more cycles or isolated immediately.

Supervisory controller 160 may be configured to receive information from one or more machines 102, 104, 106, and 108 in response to receiving a notification of a potentially missing GET 120. For example, in response to receiving this notification, supervisory controller 160 may begin to receive, store, or analyze visual data (e.g., including visual information for confirming a missing GET 120), motion data (e.g., forces experienced by a machine), location data (e.g., a geographic location), pass data (e.g., a pass count), and others, transmitted from machines 102, 104, 106, and 108. If desired, at least some of this information may also be transmitted by a monitoring system such as one or more drones 130. In some aspects, receiving and/or storing information in response to identifying a damaged or missing GET may conserve computer resources, including storage, network capacity, and processing ability.

Supervisory controller 160 may be configured to present a notification, such as an alert, to a supervisor, machine operator, or other user, to raise awareness of a potentially missing GET 120. Supervisory controller 160 may further be configured to request confirmation of the potentially missing GET 120. This confirmation request may be presented at supervisory controller 160 itself, at displays of machines 102, 104, 106, and 108 (e.g., via machine controller 122), at personal computer devices associated with operators of the machines, and/or at remote supervisory system 180.

In configurations where one or more of machines 102, 104, 106, and 108 are capable of partially-autonomous or fully-autonomous operation, supervisory controller 160 may be configured to suspend operation or cause one or more desired actions to be taken for a machine associated with a missing GET 120, including machines other than the machine with the missing GET 120. These actions may be determined based on the machine or machines that were, or are, present within a containment area. Supervisory controller 160 may further be configured to establish the containment area, including a location and size of the area, based on the likelihood that a missing GET 120 is present at a particular location.

The machine-vision system of system 100 may include a plurality of vision devices 112. Devices 112 may be configured to capture images that provide distance information (e.g., stereoscopic cameras), and may include infrared cameras, optical cameras, or a plurality of these types of cameras. Vision devices 112 are not limited to human-visible light or, in particular, to image or video, but may also include devices such as laser-based systems (LIDAR), or other types of devices that enable a controller to evaluate terrain or material, measure expected location of GETs, etc.

A first subset of vision devices 112 may be positioned to facilitate initial identification of a missing or damaged GET. For example, vision devices 112 present on earthmoving machines 102 and 104 may be directed towards implement 118. In the example shown in FIG. 1, vision devices 112 for machines 102 and 104 are present on respective implement linkage 116. In some aspects, these vision devices 112 may be secured to a boom of the machine and directed toward missing or damaged GET 120 of implement 118. As understood, these vision devices 112 may have an unobstructed view of missing or damaged GET 120 at some times, while at other times will be unable to view missing or damaged GET 120 due to material present in implement 118, or due to the position of implement 118. Other vision devices 112 may be positioned to facilitate confirmation of a missing or damaged GET and/or to locate a GET that has become separated from machines 102 or 104. These imaging devices 112 may include devices 112 on haul machines 106, these devices 112 being directed toward a bed of the respective haul machine 106. If desired, machine 108 may include an imaging device 112 directed toward material 140.

A second subset of vision devices 112 on machines 106 and 108 may be positionable towards machines 102 and 104, to facilitate confirmation of a missing or damaged GET 120. In some aspects, one or more of the first subset of devices 112 (e.g., on machine 104) may act as part of the second subset. This may occur, for example, when supervisory controller 160 generates a command causing machine 104 in environment 110 to autonomously move, such that vision device 112 on machine 104 faces a location associated with a missing GET 120, such as implement 118 of machine 102. This may be useful for confirming that GET 120 is missing, or locating the missing GET 120 when it is present in the vicinity of machine 102. Additionally or alternatively, supervisory controller 160 may generate a notification for an operator to manually move a machine to enable vision devices 112 to confirm that a GET 120 is missing, or potentially locate the missing GET 120. Devices 112 on machines 106 and 108 may be positioned such that a line of sight extends towards locations of environment 110 in the vicinity of the earthmoving machine and/or material source 150 where the machine was working. These locations of environment 110 may be determined based on one or more likely locations of a missing GET 120 (e.g., within a containment area) as determined with supervisory controller 160, as described below.

A communication system of system 100 may include a plurality of network devices 114. As shown in FIG. 1, each machine 102, 104, 106, and 108 may be equipped with a respective network device 114. Network devices 114 may enable communication via one or more networks 170, with network 170 being a local network for machines 102, 104, 106, 108, drone 130, and supervisory controller 160, that is not accessible from locations away from a worksite. Alternatively, network 170 may be accessible from one or more remote systems 180 and/or other systems remove from environment 110, by enabling communication over, for example, the Internet, via network 170. In particular, network 170 may include a wide area network ("WAN"), a local area network ("LAN"), personal area network ("PAN"), or the like. When network 170 is a local network, one or more operators or supervisors located on-site at environment 110 may be able to receive and transmit information with machines 102, 104, 106, 108, and supervisory controller 160, by using a personal computing system (e.g., a stationary computing system, mobile computing system, cellular device, tablet, etc., having a display). When network 170 is accessible remotely, remote systems, including supervisory remote systems 180 and/or personal computing systems may also be configured to receive and transmit information with machines 102, 104, 106, 108, and supervisory controller 160.

Figure 2:
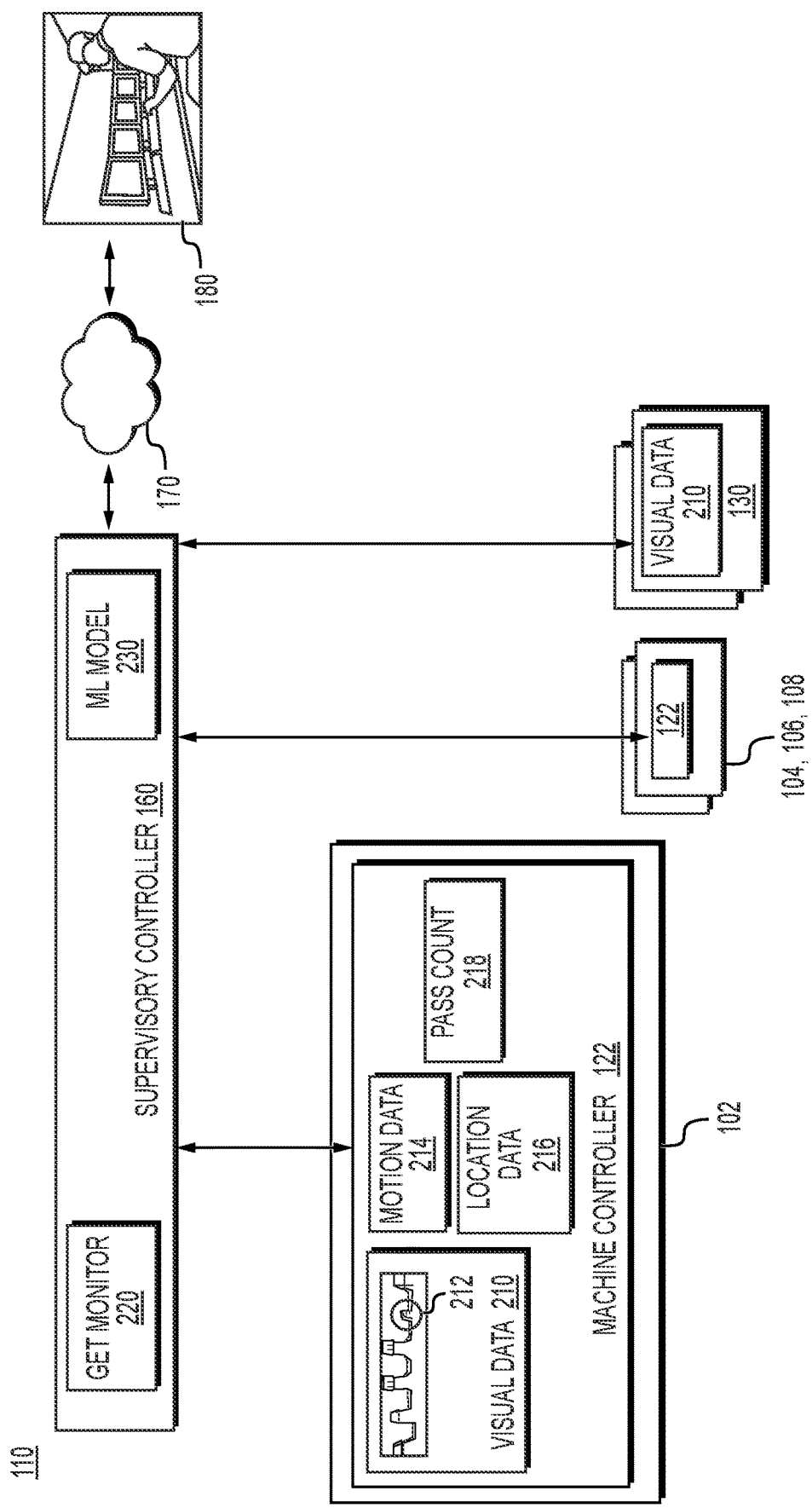
FIG. 2 is a block diagram showing exemplary components of the ground-engaging tool supervisory system of FIG. 1.

FIG. 2 is a block diagram representing communication, data sharing, and if desired, transmission of commands, between supervisory controller 160, machines 102, 104, 106, 108, remote supervisory system 180, and if desired, one or more drones 130. As shown in FIG. 2, supervisory controller 160 may receive, as inputs, information from machine controllers 122 of one or more machines 102, 104, 106, and 108. In some aspects, at least some of the information received from supervisory controller 160 may be collected and/or analyzed in response to the initial identification of a potential missing or damaged GET 120. However, some or all of the information may be received with supervisory controller 160 under normal operating conditions when no missing GET 120 has been identified.

Supervisory controller 160 may include (e.g., may include a memory programmed with) one or more modules that enable supervisory controller 160 to perform functions described herein, including the operations described with respect to method 400 below. In particular, supervisory controller 160 may include a GET monitor 220 and a machine learning ("ML") model 230.

GET monitor 220 may monitor or track, using visual and other data, GETs 120 of a plurality of machines. GET monitor 220 may enable functions including identifying potentially missing or damaged GETs 120, confirming a missing or damaged GET 120, defining a containment area alone or based on outputs from machine learning model 230, controlling one or more machines that are or were present in the containment area, and generating notifications for confirming a missing GET 120, as described herein. GET monitor 220 may receive each of the inputs transmitted to supervisory controller 160 from machines 102, 104, 106, and 108, drone 130 and may generate outputs that cause the display of notifications with machines 102, 104, 106, and 108, with supervisory controller 160 itself, with remote supervisory system 180, or with computing systems associated with operators or supervisors associated with machines 102, 104, 106, and 108.

Machine learning ("ML") model 230 may include a trained machine learning model that is configured to identify and output one or more potential locations for a missing GET 120. In some aspects, ML model 230 may be configured to output confidence level, or a confirmation, for a missing or damaged GET 120, in response to an initial identification of a missing or damaged GET 120. ML model 230 may receive, as inputs, one or more of visual data 210, motion data 214, location data 216, and pass count 218 from machine 102 or other machines 104, 106, 108, or drone 130. In some aspects, model 230 may be configured to output one or more potential locations of a missing GET 120 for monitor 220 to use when defining containment area(s) useful for generating notifications and/or controlling operation of machines 102, 104, 106, and 108 that were present within the containment area(s).

Visual data 210 may be generated with vision devices 112, for example, and transmitted with network devices 114. Visual data 210 may include real-time or delayed videos or images. As shown in FIG. 2, an image or video from vision devices 112 may provide an image including an image potential missing or damaged GET 212. This image 212 may be a thermal image, stereoscopic image, etc.

Motion data 214 may include force and/or movement information detected with IMU 124 of machine 102. Motion data 214 may include information associated with one or more links of an implement system of earthmoving machine 102 and earthmoving machine 104. This information may be useful for determining, with model 230 or another component of supervisory controller 160, one or more actions taken by machine 102. These actions may be associated with tasks that have a relatively higher probability of damaging or losing GET 120, to generate one or more containment areas and/or generate a probability map for the containment areas. For example, ML model 230 may be configured to use training data to determine events (lifts, dumps, etc.) associated with relatively high possibilities of damaging or losing GET 120, enabling GET monitor 220 to receive the determined events and generate containment areas accordingly. In other examples, motion data 214 may enable GET monitor 220 to generate a containment area based on forces measured with IMU 124 that exceed a predetermined threshold. In some aspects, monitor 220 may associate a higher likelihood of finding a missing GET 120 based on increasing forces or impacts measured with motion data 214 from IMU 124.

Location data 216 may include geographic location information of machine 102 generated with a Global Navigation Satellite System (GNSS), such as a Global Positioning System receiver (not shown), an IMU 124 having a gyroscope for determining orientation, or other device. Location data 216 may be useful to identify a location of machine 102 when a missing GET 120 partially or entirely separated from implement 118. Location data 216 may also enable the use of historical location data to identify prior locations at which GET 120 may have become lost or damaged. Location data 216 may include a geographic location (e.g., a position of the machine within the worksite), a heading of the machine, or other information.

Pass count 218 may be generated with a pass counter or other appropriate module of machine controller 122. Count 218 may monitor a number of tasks performed with machine 102. For example, earthmoving machine 102 may be configured to drive implement 118 into material source 150 and place material from source 150 (FIG. 1) in a bed of hauling machine 106 to complete a single dig pass. A pass may include a series of task portions performed with earthmoving machine 102, including collecting material from material source 150 and placing the material in a bed of hauling machine 106. Each time material is placed in a particular machine 106, the pass count 218 may increase. Count 218 may be compared to a total number of passes necessary to substantially fill the bed of hauling machine 106 without overloading.

Visual data 210, motion data 214, location data 216, and/or pass count 218 may be correlated with time information to allow supervisory controller 160 to associate one or more identified actions or events with a particular period of time. Periods of time may include, for example, a period of time prior to detection of a missing or damaged GET 120, a period of time corresponding to initial detection of a potential missing or damaged GET 120, and a period of time (e.g., a lag time described below) following this initial detection. In some aspects, supervisory controller 160 may be configured to receive and analyze the above-described inputs from machine controller 122 in response to an initial detection of a potentially missing or damaged GET made with machine controller 122.

Machine controller 122 may be programmed to identify each potential missing or damaged GET 212 based on visual data 210. Machine controller 122 may transmit a notification to supervisory controller 160 based on this identification, to enable confirmation of the missing GET based on analysis performed with supervisory controller 160 and/or confirmation generated from machines 104, 106, 108, drone 130, supervisory controller 160, remote supervisory system 180, or computer systems associated with operators or supervisors.

As shown in FIG. 2, each machine 102, 104, 106, and 108, each drone 130, and each remote system 180 may be in communication with supervisory controller 160. However, in at least some embodiments, one or more of these systems may be in communication with each other, directly or indirectly, without the involvement of supervisory controller 160. Additionally, while motion data 214, location data 216, and pass count 218 are associated with machine 102, as understood, one or more of these types of data may be provided to supervisory controller 160 by another machine (e.g., one or more of machines 104, 106, and 108). As one example, pass count 218 could be generated with a haul machine 106 that receives each pass of material, or be another machine (e.g., machine 104) that has a vision device 112 or other mechanism that can view passes performed with other machines.

Figure 5:
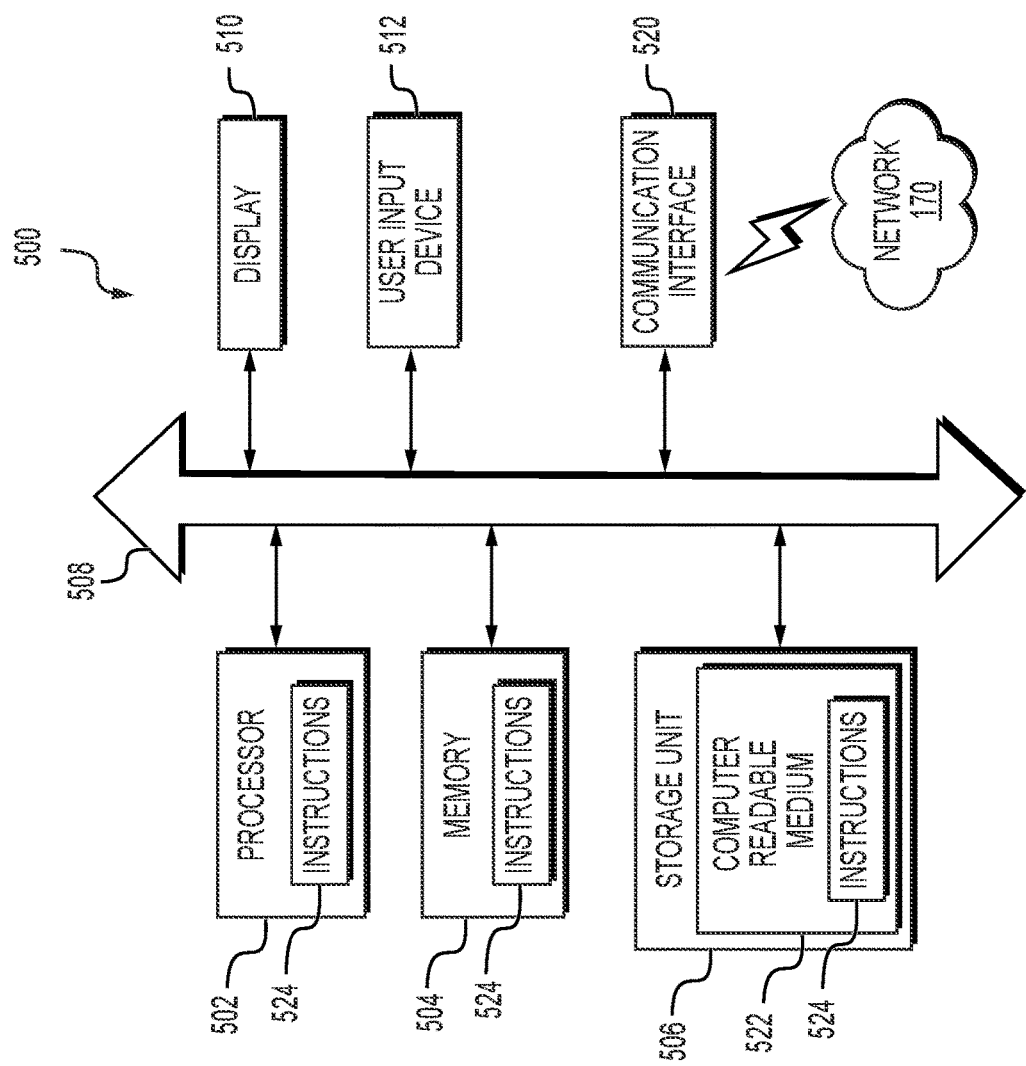
FIG. 5 is a block diagram showing an example of a computing device.

FIG. 5 is a simplified functional block diagram of a computer system 500 that may be configured as a device for executing method 400 (described below), according to exemplary embodiments of the present disclosure. System 500 represents an exemplary configuration of machine controller 122, supervisory controller 160, remote system 180, a mobile or personal computing system carried by personnel (e.g., operators) within environment 110, and/or another system according this disclosure.

Computer system 500 may include a central processing unit ("CPU") 502, in the form of one or more processors, for executing program instructions. Computer system 500 may include an internal communication bus 508, and a storage unit 506 (such as ROM, HDD, SDD, etc.) that may store data on a computer readable medium 522, although computer system 500 may receive programming and data via network communications. Computer 500 may also have a memory 504 (such as RAM) storing instructions 524 for executing techniques presented herein, although the instructions 524 may be stored temporarily or permanently within other modules of computer 500 (e.g., processor 502 and/or computer readable medium 522). Computer 500 also may include input and output ports 512 and/or a display 510 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

INDUSTRIAL APPLICABILITY

System 100 may be useful in various environments in which a ground-engaging tool may become damaged or lost, including mining environments, paving environments, construction environments, forestry environments, and others. System 100 may be useful with various types of machines, including machines suitable for a particular environment. In the example of mining applications, earthmoving machines, hauling machines, and processing machines, may be present, while cold planers, compactors, dozers, and other types of machines may be present in construction or paving environments, instead of or in addition to earthmoving, hauling, and processing machines. System 100 may be configured to monitor tools that may become separated from a machine, such as ground-engaging tools for buckets or blades. In at least some circumstances, system 100 may be configured to confirm damage (e.g., breakage), loss, or wear of a GET 212, while allowing continued operation of machines in environment 110, including machines within a containment area.

Figure 3:
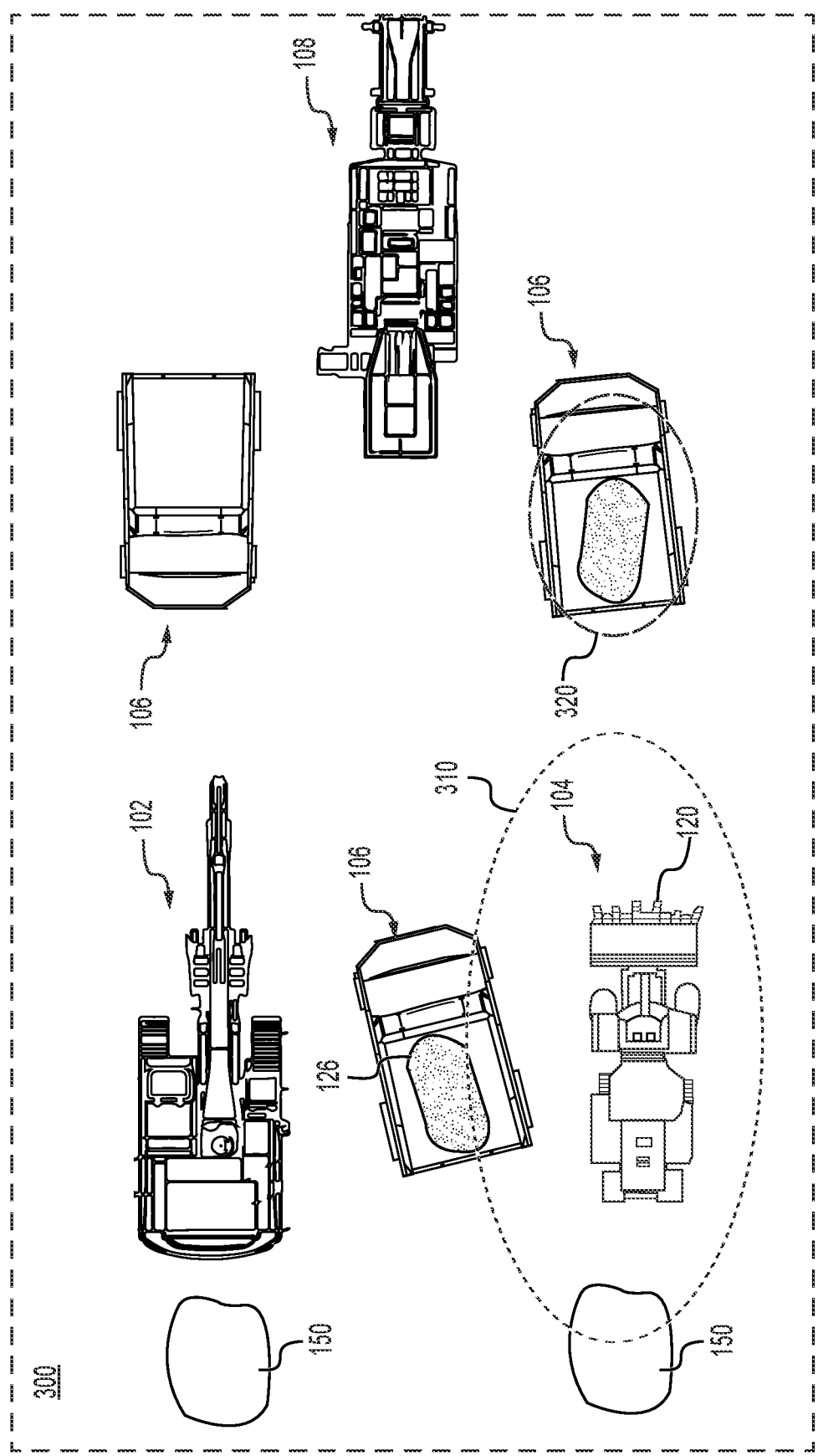
FIG. 3 is a view showing an exemplary view of a displayed image for locating a missing or damaged GET.

FIG. 3 illustrates an exemplary displayed image 300 that may facilitate location of a missing GET 120 during the operation of system 100. One or more elements of image 300 may be presented on a display associated with machines 102, 104, 106, 108, supervisory controller 160, remote supervisory system 180, or a computer system associated with an operator or supervisor. Each element shown in FIG. 3 or described with respect to image 300 may represent a visualization of calculations or determinations made with machine controller 122, supervisory controller 160, or remote supervisory system 180. However, in some embodiments, including embodiments in which image 300 is not displayed, the elements shown in FIG. 3 and described with respect to image 300 represent determinations made by supervisory controller 160, remote supervisory system 180, etc., that are not necessarily displayed with a display device. For example, a containment area 310 may be displayed to a user, if desired for a particular configuration, while in other configurations containment area 310 is generated or otherwise determined by a computing system such as supervisory controller 160 without being presented visually on a display device.

Image 300 may include one or more graphical elements representing current or previous locations of machines 102, 104, 106, and 108, locations where work is currently being performed or where work was performed previously (e.g., material source 150), and one or more containment areas 310, 320 representing locations where a damaged or missing GET 120 may be present. As shown in FIG. 3, each containment area 310, 320 covers multiple locations (e.g., locations contained within each respective oval). However, in other configurations, a containment area 310, 320 may instead be a single point (e.g., a "pin" or other icon associated with a particular location, such as a geographic location at a worksite).

Machines 102, 104, 106, and 108 may be represented by machine images 302, 304, 306, and 308, respectively. Images 302, 304, 306, and 308 may be static or moving (e.g., real-time) depictions of current locations of these machines, determined based on motion data 214. These images may also represent locations of machines 102, 104, 106, and 108 at a time when a potentially missing or damaged GET was initially identified.

As represented by ovals in FIG. 3, containment areas 310 and 320 may be determined by supervisory controller 160 based on each identified location where a missing GET 212 may be present. In some aspects, a single containment area (e.g., area 310) may be generated to capture an entire region that should be isolated due to the potential presence of a missing GET 212. The size and shape of the containment area 310 may therefore be based on: receipt of a confirmation of the missing GET 120, a time at which the missing GET 212 was first identified (e.g., by vision devices 112), an amount of time between the first identification and the receipt of confirmation ("lag time"), a distance travelled by earthmoving machine 104 associated with the missing GET 120 during or after the lag time, a number of passes during or after the lag time, and other factors. The shape of the containment areas need not be oval or circular, but may be square, rectangular, or other regular or irregular shapes. In some aspects, the terrain of environment 110 may be considered to generate a containment area.

In some aspects, containment area 310 may form a probability mapping or so-called "heat map" (an image representing areas where missing GET 120 is more likely to be found as compared to others). The areas with a higher likelihood may be represented in any suitable form, such as with colors, shading, icons, etc. A single containment area 310 may include a plurality of areas with differing likelihoods for containing missing GET 120. Additionally, multiple containment areas 310 and 320 may be present simultaneously, differing areas 310 and 320 having different likelihoods for containing missing GET 120. While these different areas 310 and 320 may overlap, they may be entirely separate from each other, as shown in FIG. 3. Additionally, while one or more areas 310 may be stationary (e.g., centered around a location where GET 120 was potentially lost), other areas 320 may move by associating or "attaching" the area 320 to a particular machine and/or particular material pile 126.

Other information may be presented in image 300, such as a pass count, a task being performed by a particular machine, a task that was performed by a machine prior to identification of a missing or damaged GET 120, etc. Other images 300 include, for example, images of an implement 118 taken from the machine associated with the implement (e.g., missing GET image 212 of FIG. 2, for confirmation of a missing or damaged GET 120), images of implement 118 taken from a different machines, images from drone 130, or others.

Each machine that was present in, or otherwise associated with, a containment area 310, 320, may be highlighted in image 300. Machines associated with a containment area 310, 320, may be isolated, prevented from travelling to processing machine 108, or may be electronically-fenced (e.g., controlled to remain in a particular region). This isolation or containment may be caused by the generation of commands for these machines via supervisory controller 160 and/or remote supervisory system 180. For example, controller 160, system 180, or both, may generate commands for autonomously isolating one or more machines that entered containment area 310. In some aspects, these commands may cause a machine to travel to a particular isolated location and release material 126. This material may be searched by personnel (e.g., operators) located in the vicinity of this machine, these operators being notified of the missing GET 212 within material 126 with a notification presented on a machine display or mobile computing system.

Containment areas 310 and 320 may be static or dynamic. For example, containment area 310 may be static, based on a geographic location of machine 104 when controller 160 first determined the possibility of a missing GET 120. Containment area 320 may move based on the travel of machine 106 transporting material 126 within which a missing GET 120 may be present.

Figure 4:
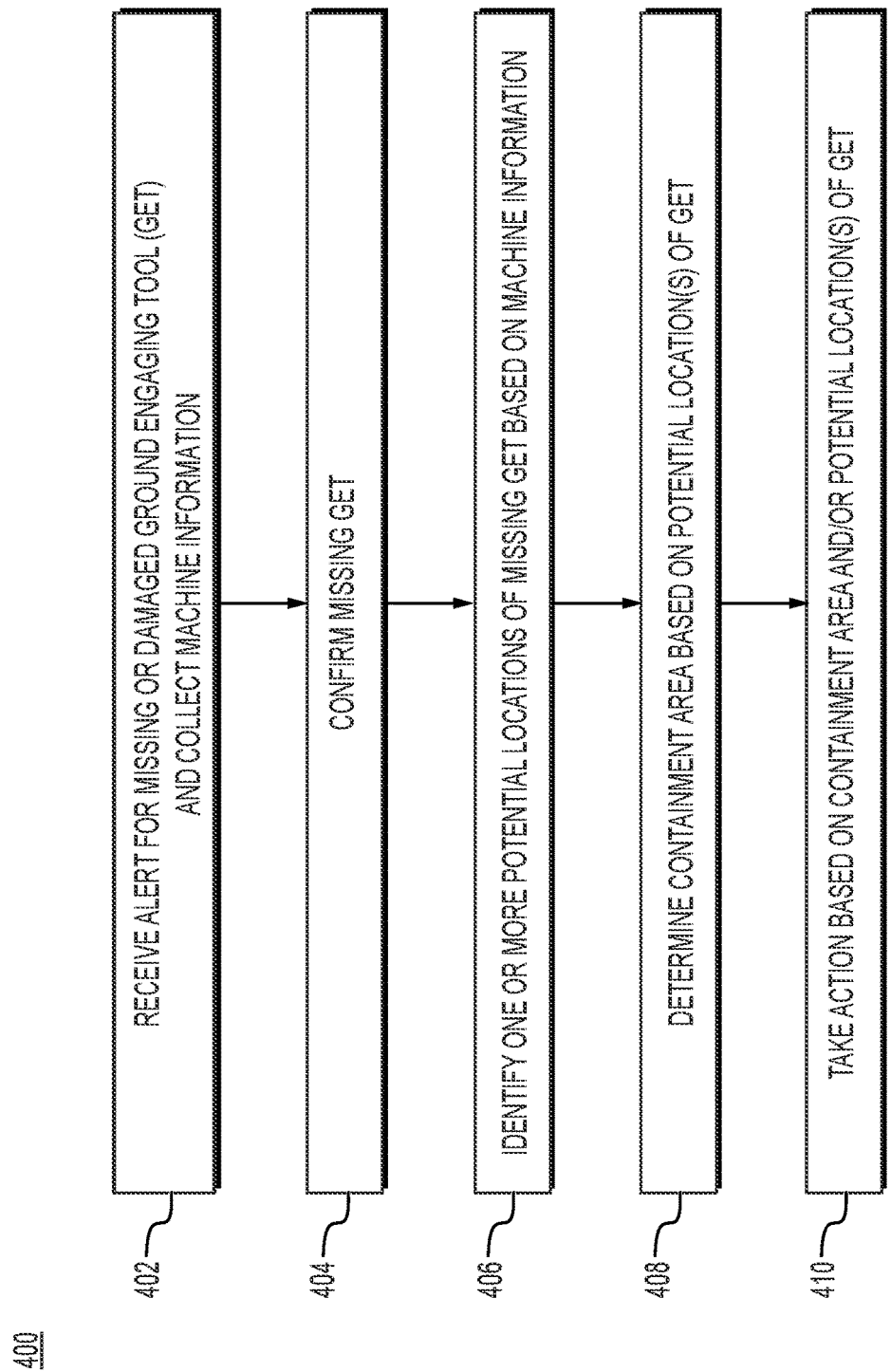
FIG. 4 depicts a flowchart of an exemplary method for ground-engaging tool monitoring, according to aspects of the disclosure.

FIG. 4 is a flowchart illustrating an exemplary method 400 for monitoring and confirming a damaged or missing tool at a worksite, such as environment 110. While method 400 is described below from the perspective of supervisory controller 160, as understood, other systems included in system 100, such as remote supervisory system 180, may perform at least one, and possibly all, of the steps of method 400.

In a step 402, supervisory controller 160 may receive an alert for a potentially missing or damaged GET 120, with the phrases "receive an alert" and "receiving an alert" including alerts that are generated with supervisory controller 160 itself (and presented on a display, transmitted to another system, or causing another action) based on visual data 210 and/or other received information. For example, this alert may be generated according to an analysis of visual data 210 including a missing GET image 212. Receiving an alert may also include receiving a notification of a possible missing GET 120 from a machine or other system in communication with controller 160.

In response to this received alert, supervisory controller 160 may generate a notification requesting confirmation via GET monitor 220. Additionally, supervisory controller 160 may begin collecting machine information. Collecting information may include one or more of: receiving information, recording information, or receiving an increased amount of information, from machines 102, 104, 106, and/or 108. This information may include visual data 210, motion data 214, location data 216, and pass count 218. The information may be received from the machine associated with the missing GET 120, or machines within a predetermined distance or having a line of sight to the machine with the missing GET 120 or the potential location of the missing GET 120.

The request for confirmation may be presented on a display of supervisory controller 160 and/or one or more other devices of system 100, as described above. The request may be presented on a display within a cabin of a machine by machine controller 122 for the machine having the missing GET 120, or a display of one or more machines that have a view of the machine with the missing GET or that are within a predetermined area of the machine with the missing GET. As described above, the request may also be displayed on one or more mobile computing systems (e.g., cellular phones) associated with these machines.

The confirmation request may include visual data 210 captured with vision device 122, showing implement 118 or an area (e.g., material 126 in a bed of a haul machine 106). The image may be a real-time video, a current image, or an image 212 and/or video from the moment in time when the missing GET 120 was first detected.

Based on the request, one or more responses may be received in step 404, including a response that confirms the missing GET 120. The confirmation may be based on the visual data 210 transmitted or presented during step 402. Thus, the confirmation may identify the machine (e.g., machine 104) having the missing GET 120. The confirmation may be automatically generated, or manually generated by an operator interacting with an input device of machines 102, 104, 106, or 108, an operator or other personnel's mobile device, controller 160, or system 180.

The confirmation in step 404 may be affected by the manner in which the missing GET 120 was confirmed. For example, confirmation may be received by personnel viewing image 212 and providing confirmation that image 212 depicts a missing or damaged GET 120. This image 212 may be an image generated after the initial identification of the missing GET 120, and may be an image taken by the vision device 122 of a machine other than the machine associated with the GET 120. In other aspects, the image used for confirmation may be the initial (i.e., first) image in which a potentially-missing GET 120 was identified. Additionally, the confirmation may be performed automatically, e.g., by image analysis performed with controller 160 or another system described herein. Finally, the confirmation may be based by an operator or other personnel's in-person observation of the implement 118 with the missing or damaged GET 120.

A step 406 may include identifying one or more potential locations of missing GET 120 with GET monitor 220. For example, GET monitor 220, model 230, or both, may analyze visual data 210, motion data 214, and location data 216. Visual data 210 may be useful to determine an initial time at which missing GET 120 was first identified, and may include prior images or videos to determine the last known time at which GET 120 was still present and undamaged. Motion data 214 may be useful to identify one or more actions performed with a machine associated with missing GET 120, including machine 102 that performed an action that potentially caused GET 120 to become separated from implement 118, as well as one or more actions of a haul machine 106 that receive material from machine 102 that may have resulted in transporting GET 120. GET monitor 220 may employ computer-vision and GPS data or other location information to facilitate one or more of these determinations. In conjunction with GET monitor 220, or acting independently, ML model 230 may employ a trained model (e.g., a model that was trained based on prior incidents in which a GET was lost or damaged) to identify possible locations of the GET 120, according to historical data.

A step 408 may include determining one or more containment areas, such as areas 310 and 320 (FIG. 3) with GET monitor 220. The potential locations of GET 120 that were identified in step 406 may be used to determine one or more containment areas. For example, a location, size, and shape of containment area 310 may be based on the current location of machine 104 associated with the missing GET 120, past locations of machine 104 subsequent to the last positive identification of all GETs on machine 104, and interactions of machine 104 with other machines, such as haul machines 106. As described above, motion data 214 may also be used to determine these characteristics of each containment area.

In some configurations, a first containment area 310 may be established based on machine 104 that lost a GET 120, and a second containment area 320 may be based on a haul machine 106 carrying material 126 that may also contain at least part of the missing GET 120. The second containment area 320 may therefore be generated based on the actions of machines 104 and 106 that occurred within first containment area 310.

In configurations where containment areas 310 and 320 are presented in image 300 during step 408, the respective areas 310 and 320 may be displayed with differing colors, shading, or other indicia of a relative confidence that the missing GET 120 is located within a particular containment area. If desired, each containment area 310 and 320 may form a probability map, as described above, in which portions of each area 310 and 320 indicate sub-areas or portions that have a higher likelihood of containing the missing GET 120. Additionally, the size, shape, or heat map portions of areas 310 and 320 may be based on the above-described lag time between which the first identification of a potentially-missing GET 120 was made (e.g., in step 402) and the receipt of the confirmation (e.g., in step 404), and movements of one or more machines that were present in a containment area during these times.

A step 410 may include taking one or more actions based on the containment areas 310 and 320. In particular, step 410 may include generating commands for autonomously controlling machines that are currently in a containment area, or that were previously in a containment area. As a first example, step 410 may include generating a command for a haul machine 106 (e.g., machine 106 associated with area 320) to travel to an isolation area and dump material 126 to enable an automated or manual search of this area by personnel, drones 130, vision devices 112 on-board or off-board machines, etc. Commands may also be issued to enable direction of thermal imaging devices (e.g., one or more devices 112) towards the potential location(s) of a missing GET 120, which may retain sufficient heat to facilitate thermal identification. Additionally, haul machine 106 may be electronically-fenced and prevented from entering a prohibited area in which haul machine 106 would otherwise be permitted to enter, by issuing autonomous commands or notifications. For example, haul machine 106 may be prevented from entering an area within a predetermined distance of processing machine 108.

In a second example, step 410 may include monitoring machines within a containment area, but allowing at least some continued operations. For example, a haul machine 106 partially or entirely located within containment area 310 may continue receiving material from an earthmoving machine 102 that does not have a missing or damaged GET. In some configurations, an earthmoving machine 104 with a potentially missing GET 120 may also be permitted to continue loading material in this haul machine 106. This may continue until pass count 218 reaches the maximum amount of passes associated with a fully-loaded haul machine 106. At this time, operation of the haul machine 106 may be paused until the missing GET 120 is located, or until supervisory controller 160 receives a notification that the potentially-missing GET 120 is still present on implement 118.

When a potentially-missing GET 120 is identified as being undamaged and/or still present on implement 118, or when the missing GET 120 is located, as described above, remedial actions such as isolation, electronic fencing, etc., may be cancelled. For example, a haul truck 106 that was isolated and/or prevented from traveling to processing machine 108 may receive commands (autonomous commands and/or manual commands) to continue operations by traveling towards processing machine 108. In examples where processing machine 108 itself stops or pauses operation, this operation may also resume. An earthmoving machine 102 or 104 may continue operating by moving material 150 and/or loading haul machines 106. Finally, each containment area may be ignored or deleted, and systems that received a request for confirming the missing GET 120 may receive a second notification that the GET 120 was located or was not lost.

System 100 and method 400 may be useful for accurately identifying a potentially missing ground-engaging tool, while facilitating continued operation of a worksite, such as a mining environment. Confirmation of a missing tool may avoid false positives, avoiding the tendency of an operator to ignore a notification of a missing ground-engaging tool. Additionally, collecting or recording information in response to the initial determination of a missing tool may reduce storage and processing requirements. Additionally, using automations for confirming a missing tool and/or locating such a tool, including machine learning, machine-vision, etc., may allow at least some continued operation (e.g., continued loading cycles). Thus, at least some operations may be continue, while machines that may unknowingly transport a missing tool are prevented from placing material in a machine for further processing. Worksite efficiency may therefore be improved while machine damage is avoided. Additionally, visualizations illustrating possible locations of a missing tool may facilitate location of the tool. These visualizations may enable operation of manually-controlled machines in a manner that prevents the introduction of a missing or damaged tool into a processing machine. System 100 and method 400 may generate a map or other identification of a probability that a missing tool will be located in a particular location.

It will be apparent to those skilled in the art that various modifications and variations can be made to the disclosed system and method without departing from the scope of the disclosure. Other embodiments of the system and method will be apparent to those skilled in the art from consideration of the specification and system and method disclosed herein. It is intended that the specification and examples be considered as exemplary only, with a true scope of the disclosure being indicated by the following claims and their equivalents.

What is claimed is:

1. A controller for monitoring and confirming damaged or missing ground-engaging tools at a worksite, the controller comprising:
   at least one memory storing instructions; and
   at least one processor operatively connected to the memory, and configured to execute the instructions to perform operations, the operations including:
      receiving an alert associated with a damaged or missing ground-engaging tool of an earthmoving machine;
      receiving a confirmation for the damaged or missing tool;
      generating a containment area representing one or more locations where at least part of the ground-engaging tool is potentially located, where the containment area is based on time information associated with the earthmoving machine, and where the time information includes time information including at least one of a period of time prior to detection of the damaged or missing tool, a period of time corresponding to initial detection of the damaged or missing tool, or a period of time following the initial detection of the damaged or missing tool;
      determining that an additional machine was present in the containment area; and
      generating a notification for an operator of the additional machine to move the additional machine outside of the containment area or controlling the additional machine to move outside of the containment area.

2. The controller of claim 1, wherein the additional machine is a haul truck having a bed that received material from the earthmoving machine.

3. The controller of claim 2, wherein the operations further include causing the haul truck to pause operation or travel to an isolation area after receiving the material from the earthmoving machine.

4. The controller of claim 3, wherein at least some of the material is received by the haul truck after receiving the alert associated with the damaged or missing ground-engaging tool.

5. The controller of claim 3, wherein the operations further include preventing the additional machine from traveling to a processing machine after receiving the confirmation.

6. The controller of claim 1, wherein the confirmation is received from a machine or a system other than the earthmoving machine associated with the damaged or missing ground-engaging tool.

7. The controller of claim 1, wherein the operations further include displaying the containment area as the notification.

8. The controller of claim 7, wherein the containment area is presented as a probability map showing a plurality of different possible locations of the damaged or missing tool.

9. A controller for reducing false alarms associated with damaged or missing tools, the controller comprising:
   at least one memory storing instructions; and
   at least one processor operatively connected to the memory, and configured to execute the instructions to perform operations, the operations including:
      receiving an alert associated with a potentially damaged or missing tool of an earthmoving machine;
      in response to receiving the alert, generating a containment area representing one or more locations where at least part of the damaged or missing tool is potentially located, where the containment area is based on time information associated with the earthmoving machine, and where the time information includes time information including at least one of a period of time prior to detection of the damaged or missing tool, a period of time corresponding to initial detection of the damaged or missing tool, or a period of time following the initial detection of the damaged or missing tool;
      requesting confirmation of the potentially damaged or missing tool;
      continuing to perform work with the earthmoving machine after receiving the alert; and:
         receiving confirmation of the damaged or missing tool and generating a signal for isolating or stopping the earthmoving machine or an associated machine such that the earthmoving machine or the associated machine are positioned outside of the containment area; or
         receiving confirmation that the potentially damaged or missing tool is not damaged or missing and allowing the earthmoving machine or the associated machine to continue operating.

10. The controller of claim 9, wherein the signal for stopping the earthmoving machine causes the earthmoving machine to stop placing material in a bed in a haul truck, the haul truck being the associated machine.

11. The controller of claim 10, wherein the operations further include causing isolation of the haul truck by preventing the haul truck from transporting the material to a crushing machine.

12. The controller of claim 9, wherein the operations further include receiving one or more images or videos of an implement of the earthmoving machine for requesting confirmation of the potentially damaged or missing tool.

13. The controller of claim 9, wherein the controller further comprises a machine learning model configured to determine a confidence level associated with the potentially damaged or missing tool.

14. A supervisory controller for monitoring and confirming a missing or damaged tool for an earthmoving machine, the controller comprising:
   at least one memory storing instructions; and
   at least one processor operatively connected to the memory, and configured to execute the instructions to perform operations, the operations including:
      receiving an alert associated with a damaged or missing tool of the earthmoving machine;
      in response to receiving the alert, receiving machine location information associated with the earthmoving machine and time information, where the time information includes time information including at least one of a period of time prior to detection of the damaged or missing tool, a period of time corresponding to initial detection of the damaged or missing tool, or a period of time following the initial detection of the damaged or missing tool;
      generating a request for confirming the missing or damaged tool; and
      generating a containment area, based on the machine location information, based on the time information, and based on receiving a confirmation of the missing or damaged tool, wherein the supervisory controller generates commands to isolate the earthmoving machine when the earthmoving machine was located within the containment area.

15. The supervisory controller of claim 14, wherein the controller further comprises a machine learning model configured to determine a confidence level associated with the damaged or missing tool.

16. The supervisory controller of claim 15, wherein the machine learning model is configured to identify one or more images or videos for confirming the missing or damaged tool, the confidence level being determined based on the one or more images or videos.

17. The supervisory controller of claim 14, further including receiving machine motion data indicative of one or more of an articulation of an implement, articulation of an implement linkage, and a dump location, the containment area being determined based on the motion data.

18. The supervisory controller of claim 14, wherein the operations of isolating the earthmoving machine further include:
   receiving confirmation of the missing or damaged tool; and
   in response to the confirmation, generating a command to cause the earthmoving machine to travel autonomously to an isolated location.

19. The supervisory controller of claim 14, wherein the containment area is fixed.

20. The supervisory controller of claim 14, wherein the containment area moves over time.

* * * * *